Feb. 3, 1970 R. P. HUNT 3,493,694

MAGNETORESISTIVE HEAD

Filed Jan. 19, 1966 3 Sheets-Sheet 1

ROBERT P. HUNT
INVENTOR.

BY Robert S. Clay

ATTORNEY

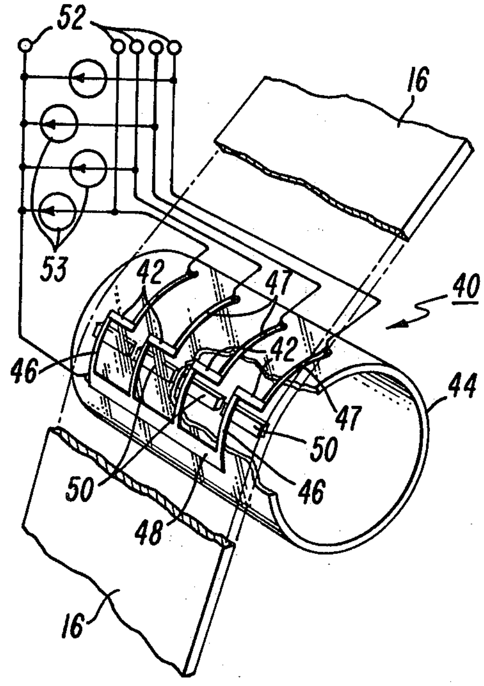
FIG. 4
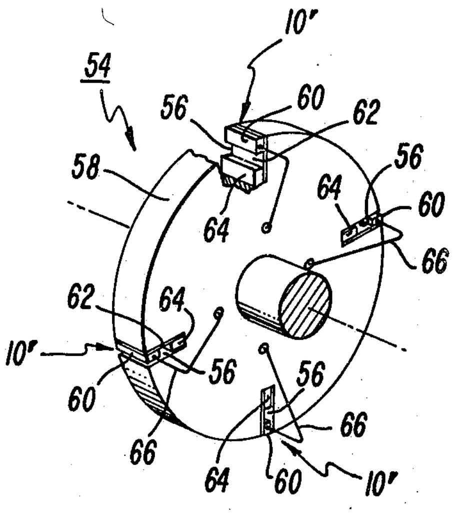
FIG. 5
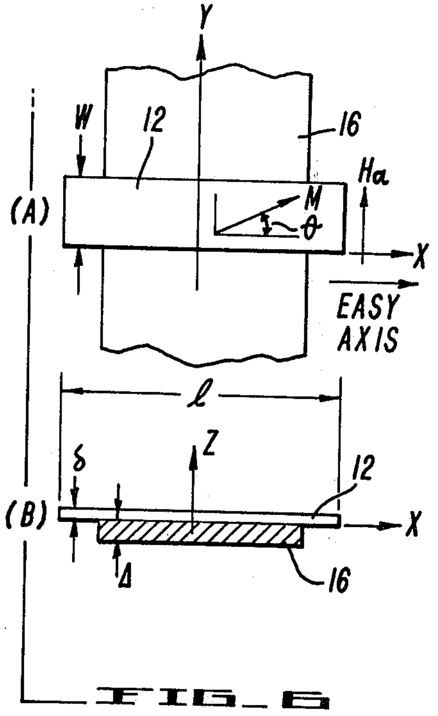
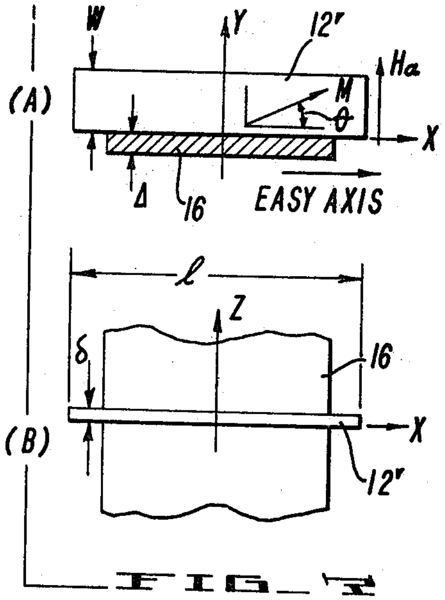
ROBERT P. HUNT
INVENTOR.
BY Robert S. Clay
ATTORNEY ROBERT P. HUNT
INVENTOR.
BY Robert S. Clay
ATTORNEY United States Patent Office 3,493,694
Patented Feb. 3, 1970

3,493,694
MAGNETORESISTIVE HEAD

Robert P. Hunt, Menlo Park, Calif., assignor to Ampex Corporation, Redwood City, Calif., a corporation of California Filed Jan. 19, 1966, Ser. No. 521,613
Int. Cl. G11b 5/12
U.S. Cl. 179—100.2 14 Claims

ABSTRACT OF THE DISCLOSURE

A magnetoresistive head utilizing a narrow strip or element of magnetic material of low anisotropy. The element may be disposed either on edge (to detect vertical magnetic field components) or on its side (to detect longitudinal magnetic field components) relative to a magnetic tape. The tape's field causes changes in the magnetization of the element, to thereby modulate the resistance thereof through the magnetoresistive effect. To this end, as the tape passes the magnetoresistive head, the fields stored in the tape rotate the spin system of the magnetic element to modify accordingly the resistivity thereof. Thus the output obtained from an exterior circuit coupled only at either end of the element assumes the form of current fluctuations representative of the information stored in the magnetic tape. The concept is particularly adaptable to multichannel or rotary head constructions.

The present invention relates to magnetic reproduce heads and in particular to a novel magnetic head utilizing the magnetoresistive effect.

There are several types of magnetic heads in use at present utilizing various well known principles of operation, such as for example, the conventional ring head utilizing an electromagnetic effect, and different types of heads utilizing the Hall effect. In the ring heads, the forming of a gap is essential and creates inherent problems such as limitations on the frequency response due to the gap length. Furthermore, such heads measure the time rate of change of flux and thus detect the time derivative of flux, that is, the change of magnetization in a storage medium such as tape as it passes adjacent thereto. Hall effect heads have a poor signal-to-noise ratio, and in operation depend upon the current flow therethrough as well as the magnetic field of the recording medium. In addition, access to all six faces of the Hall head element is required for connections, etc. Both such head configurations are difficult to assemble, and/or fabricate, particularly when constructing a multichannel head assembly.

The present invention provides an entirely new concept of operation and construction in the field of magnetic heads, in that it provides an extremely simple and easily fabricated magnetic head, which operates on magnetoresistive principles.

Accordingly it is an object of the present invention to provide a magnetoresistive reproduce head of relatively simple configuration which lends itself to inexpensive fabrication.

It is a further object of the invention to provide a magnetoresistive reproduce head utilizing a narrow strip of ferromagnetic metallic material as the field sensing element.

It is another object of the invention to provide a magnetoresistive reproduce head having an improved frequency response relative to conventional heads.

It is another object of the invention to provide a magnetoresistive head which has flux sensitive qualities, and which exhibits a flat frequency response in a uniform field, from direct current conditions to a frequency approaching a gigacycle; it has no inherent frequency limitations.

It is still another object of the invention to provide a magnetoresistive head which lends itself to a relatively simple and inexpensive multi-channel assembly.

It is yet another object of the invention to provide a magnetoresistive head particularly adapted to rotary head assembly construction.

Further objects and advantages will be apparent from the specification taken in conjunction with the drawings wherein:

FIGURE 4 is a simplified perspective view depicting a multichannel, longitudinal magnetoresistive head;

FIGURE 5 is a simplified perspective view of a partially broken-out rotary head assembly employing the magnetoresistive head of the invention of FIGURE 2.

FIGURES 6A, 6B and 7A, 7B are top and end views of the invention of FIGURES 1 and 2 respectively, depicting the co-ordinate systems used to explain the underlying theory of operation;

The principle of operation of the magnetoresistive head in accordance with the invention comprises disposing a narrow strip or element of material of low anisotropy, i.e., a ferromagnetic film element, in close proximity to a magnetic storage medium such as magnetic tape. The tape's field causes changes in the magnetization of the film element and thereby modulates the resistance thereof through the magnetoresistive effect. That is, as the tape passes the magnetoresistive head, the fields recorded thereon as information rotate the spin system of the magnetoresistive film element to modify accordingly the resistivity thereof. Thus, the output obtained from an exterior circuit coupled to the film element assumes the form of current fluctuations representative of the information stored in the magnetic tape.

Figure 1:
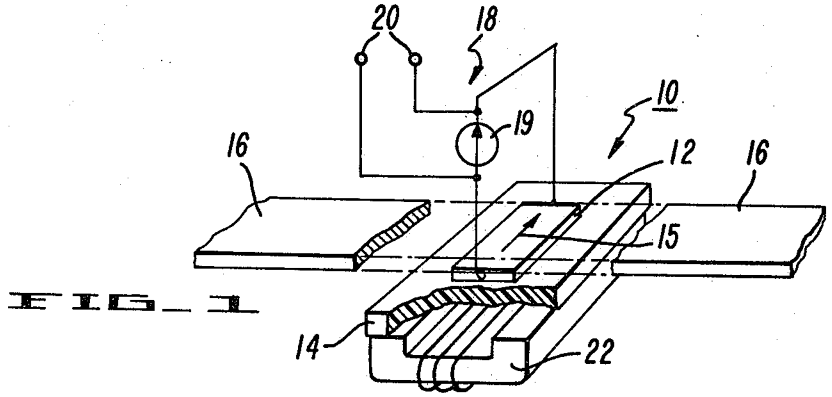
FIGURE 1 is a simplified perspective view of a basic configuration of the present invention.

Accordingly, FIGURE 1 depicts a magnetoresistive head which detects longitudinal field components and which is hereinafter termed a longitudinal magnetoresistive head 10. By way of example only, a film element 12 preferably formed of a thin, narrow strip of ferromagnetic metallic material of low anisotropy, such as Permalloy, having a width W of the order of 1 mil, and a thickness $\delta$ of the order of 600 angstroms, is evaporated onto a glass or similar, electrically nonconductive substrate 14, with the direction of easy axis oriented as indicated by arrow 15. The glass substrate 14 provides the support for the film element 12, whereby the element is maintained in close proximity to a tape 16 passing adjacent thereto. Although glass is particularly employed herein, any material having a smooth surface may be used, whether it is hard or soft, e.g., Mylar, or metal such as copper or aluminum with a sputtered layer of silicon dioxide disposed thereon. An exterior circuit 18 is coupled to the thin film element 12, with two conducting leads secured thereto at either end thereof, and with a driving current source 19 of high impedance serially inserted therein. Output terminals 20 are provided across the driving current source 19.

Since the magnetoresistive effect obeys a square law it is preferable to linearize the device as exemplified in FIGURE 1 by means of either a static bias field or an alternating current bias field, applied transversely to the element 12 by a magnetic field source. The magnetic field source, depicted herein by way of example only as an electromagnet 22, can be either a permanent magnet as in the static case, or an electromagnet or solenoid as in the alternating current case. The main requisite is that the field is uniform across the width of the film element 12.

It is to be understood that the various elements of the invention, particularly the film elements, are shown in FIGURES 1–5 substantially out of proportion in order to clarify their construction and the description of the invention.

Figure 2:
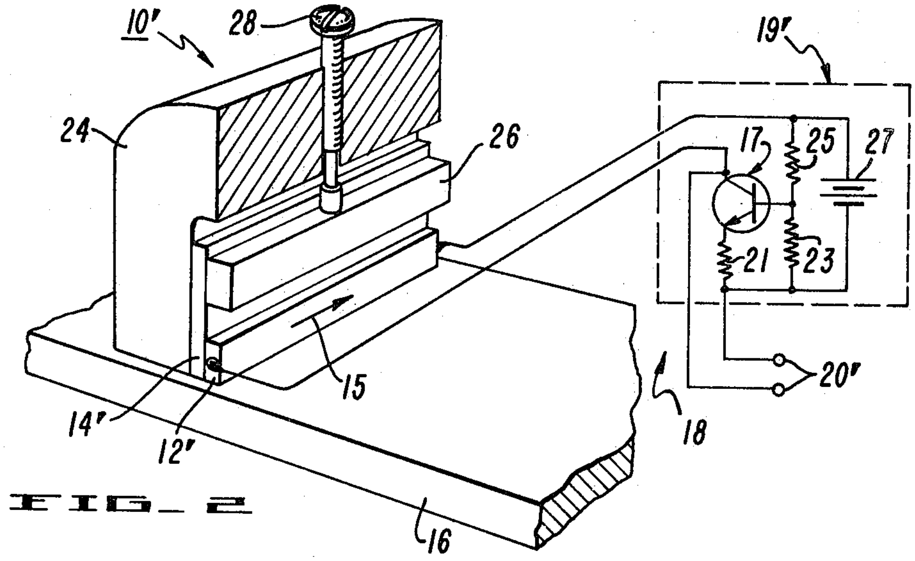
FIGURE 2 is a simplified perspective view of another basic configuration, and associated exemplary construction and schematic circuit, of an alternative embodiment of the present invention.

FIGURE 2 shows an alternative configuration of the present invention, herein termed a vertical magnetoresistive head 10' further exemplifying a simplified construction thereof. The vertical magnetoresistive head 10' detects only vertical field components of the passing tape 16. Accordingly, a ferromagnetic thin film element 12' similar to that of FIGURE 1 is disposed vertically, i.e. on edge, relative to the plane of the tape 16, and suitably supported adjacent thereto as by means of, for example, a glass substrate 14'. The substrate 14' is, in turn, supported within a field shielding, support member 24 in slidable relation therewith, whereby replacement of the element 12' is facilitated by simply sliding the old substrate 14'-element 12' out of the member 24. The arrow 15' indicates the direction of easy axis of the film element 12'. As in the FIGURE 1 configuration, a suitable bias field is applied to the vertical magnetoresistive configuration in a direction transverse to the film element 12' by means of a permanent magnet or electromagnet, herein indicated as permanent magnet 26. The permanent magnet 26 is slidably secured adjacent the substrate 14' and is adapted for reciprocal movement relative to the film element 12' to allow adjusting the degree of magnetic field bias introduced to the element by the magnet 26. Translation is provided by means of a threaded adjusting screw 28 disposed in the support member 24, and rotatably secured at its end to the magnet 26.

The film element 12' is serially connected to an exterior circuit 18 similar to that depicted in FIGURE 1, which comprises in essence a driving current source and output terminals. By way of example only, one possible exterior circuit 18 embodiment is depicted in FIGURE 2 and utilizes a high impedance current source 19' and output terminals 20'. Briefly, the current source 19' comprises an NPN transistor 17, such as, for example a ZN–2219, having the usual base, collector and emitter electrodes, with the collector connected to one side of the film element 12', the emitter connected to one side of an emitter resistor 21, and the base connected to a common connection between two bias producing resistors 23 and 25. The opposite end of resistor 23 is connected to the free end of emitter resistor 21 and also to the negative terminal of a direct current voltage supply 27. The opposite end of resistor 25 is connected to the positive terminal of the supply 27 and also to the free end of the film element 12'. The output from the magnetoresistive head 10' is provided via output terminals 20' which are connected respectively to the collector of transistor 17 and the common connection between resistors 21, 23 and the negative terminal of supply 27.

Figure 3:
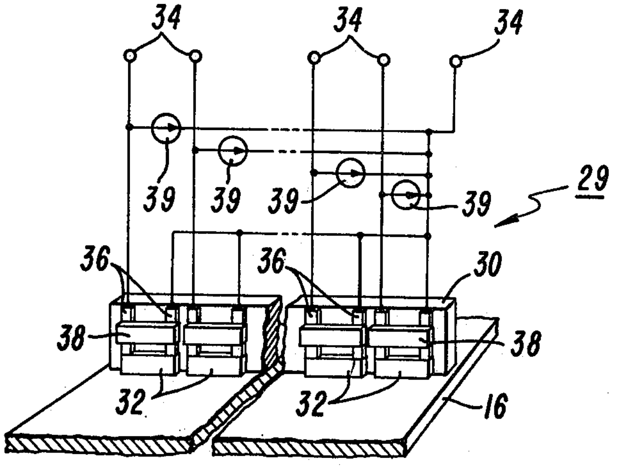
FIGURE 3 is a simplified perspective view of a portion of a multichannel, vertical magnetoresistive head.

FIGURE 3 exemplifies a multichannel magnetoresistive head configuration 29 utilizing the principles of the vertical head 10' of FIGURE 2. A glass substrate 30 is supported in perpendicular relation to the tape 16 by a field shielding, support member (not shown) of the type depicted for example in FIGURE 2. Ferromagnetic film elements 32 are disposed along the edge of the substrate 30, adjacent the tape 16, and are each connected to respective terminals 34 via thin conducting strips 36, formed for example of copper, and deposited upon the substrate to extend from each end of the respective elements 32. Permanent magnets 38 are adjustably disposed adjacent respective film elements 32 in electrically insulated relation therewith, to provide the transverse, uniform magnetic bias field thereacross, and a driving current source 39 is serially connected across each element 32. The number of individual elements 32 deposited upon a single substrate 30, as well as the lengths thereof, can be varied to obtain a multichannel head of the required number of channels. Such a head configuration lends itself to relatively simple fabrication with well known techniques of electro-deposition and etching.

Briefly, and by way of example only, the multichannel head depicted in FIGURE 3 may be fabricated by first sputtering a thin layer of Nichrome material on the glass substrate 30 of suitable dimensions. Then a thick layer of copper, e.g., 1000 A. to 1 micron, is electroformed on the Nichrome layer. The copper is next masked to provide the desired pattern of conducting strips 36, and the unmasked portions are photoetched by well known techniques to remove all the copper and Nichrome in register with such unmasked portions. The substrate 30 and conducting strips 36 are then masked off except for those narrow strips which define the film elements 32 extending between adjacent pairs of conducting strips 36. Finally, the selected conducting magnetic material, e.g. Permalloy, is evaporated onto the unmasked portions of the substrate 30, forming the individual, narrow, magnetoresistive film elements 32 in electrical connection with associated pairs of conducting strips 36, wherein each element 32 defines an individual magnetoresistive head in accordance with the invention.

FIGURE 4 depicts a multichannel magnetoresistive head configuration 40 utilizing the principles of the longitudinal head 10 of FIGURE 1. The head 40 comprises a series of film elements 42 deposited, as hereinbefore described, at spaced intervals upon a glass substrate which is exemplified herein as preferably a hollow glass cylinder 44. Pairs of conducting strips 46, 47, preferably of copper, are deposited on the cylindrical substrate 44 and are connected to either end of the respective elements 42 to extend therefrom in opposite directions. A common bus 48 of copper is deposited on the substrate parallel to the film elements 42 and is electrically connected to all the conductor strips 46 extending from one end of each element 42. The bus 48 provides thus one common exterior connection rather than four individual connections. Permanent magnets 50 are disposed within the hollow, cylindrical substrate 44 and spaced an adjustable distance from the respective film elements 42 as exemplified in FIGURE 2, to provide the transverse, uniform bias field of previous description. Thus the head 40 provides, in this case, four heads disposed side-by-side against which a tape 16 is passed. Output terminals 52 are provided connected across respective driving current sources 53, which are, in turn, each serially connected to the bus and to respective conducting strips 47.

Although the head 40 of FIGURE 4 is shown deposited upon the curved circumference of the hollow, cylindrical substrate 44, a preferred and simplified construction technique would be to deposit the film elements 42, conducting strips 46, 47 and bus 48 on a flat Mylar sheet, and then tightly secure the sheet about a hollow mandrel of suitable, preferably cylindrical form. The bias field magnets 50 are thereafter adjustably secured therein as depicted in FIGURE 4 within the hollow substrate 44 at spaced distances from their respective film elements 42.

FIGURE 5 shows a simplified rotary head assembly 54 utilizing a spaced plurality of vertical magnetoresistive heads 10' of the invention, as depicted in FIGURE 2. The heads 10' are secured within radially extending slots 56 formed within a circular rotary head disk 58 of otherwise generally conventional construction. The heads 10' each comprise a film element 60 secured either to a suitable substrate 62 or directly to a prepared, non-conducting surface of film (not shown) formed on the surface of the slot 56. The preferred construction would utilize the substrate 62 as a support for the film element 60, as well as a permanent magnet 64. The substrate 62 is held in position within the disk 58 by demountable yet rigid means such as pins or transverse slots whereby the entire head may be readily replaced.

The permanent magnets 64 have means (not shown) for adjusting their position relative to respective film elements 60, as exemplified in FIGURE 2. Conductors 66 extend radially inward from either end of the film elements 60 to provide connections to external circuits, generally via a suitable commutator means (not shown) or by utilizing rotary transformer devices (not shown), in a manner well known in the art. Driving current sources (not shown) are provided to each element 60 as hereinbefore shown with respect to the FIGURES 1–4.

The magnetoresistive heads can also be utilized in rotary drum constructions, wherein a plurality of channels are reproduced. Additionally, although the vertical head 10' of FIGURE 2 is herein shown with respect to the rotary head construction of FIGURE 5, the longitudinal head 10 of FIGURE 1 is equally as applicable therefor.

In theory, the resistivity $\rho$ of a ferromagnetic polycrystal such as that forming the film element 12 may be expressed as $$\rho=\rho_0+\Delta\rho\cos^2\theta \qquad (1)$$

where $\rho_0$ is the bulk resistivity, $\Delta\rho$ is the magnetoresistive coefficient, and $\theta$ is the angle between the magnetization M and the measuring current I. For Permalloy material, $\Delta\rho$ amounts to about 2% of $\rho_0$.

Thus it is desirable to establish an equilibrium angle between M and I of approximately 45° to obtain a linear mode of operation. This may conveniently be accomplished by establishing an anisotropy whose easy axis coincides with the longitudinal axis A of the film element and by using a transverse bias field to set the equilibrium angle. To exemplify the operation of the invention the demagnetizing fields, anisotropy and magneto-static interaction within the film are taken into account. Exchange forces may be registered as negligible. With the geometry defined in FIGURES 6A–B and 7A–B, the $y$ component of field acting on the film elements 12 may be written $$H_y=H_a-N_yM_y \qquad (2)$$

where $H_a$ is the total applied field, $M_y$ is the $y$ component of magnetization, and $N_y$ is an average demagnetizing factor. To simplify the description herein and as a useful approximation it is assumed that the magnetization is uniform across the width of the element 12.

The component $H_y$ provides a torque which is counterbalanced by the anisotropy. At equilibrium the spin angle $\theta$ is determined by $$(H_a-N_yM_y)M_s\cos\theta=2K\sin\theta\cos\theta \qquad (3)$$

where $M_s$ is the saturation magnetization of the element and $M_x^2+M_y^2=M_s^2$, where we have assumed a single uniaxial anistropy energy of the form $E=-K\cos^2\theta$. K is the usual anisotropy coefficient. From FIGURE 6A it is clear that $\sin\theta=M_y/M_s$ and from Equation 3

$$\sin\theta=H_a/(H_k+N_yM_s)$$

whereupon $$\rho=\rho_0+\Delta\rho\left\{1-\frac{H_a^2}{(H_k+N_yM_s)^2}\right\} \qquad (4)$$

Assuming that the device terminals are equipotentials we sum the current over the width of the strip.

$$I=V\int\frac{\delta dy}{\rho l}=\frac{V}{R_0}\frac{1}{W}\int_0^W\frac{dy}{1+\frac{\Delta\rho}{\rho_0}\left[1-\frac{H_a^2}{(H_k+N_yM_s)^2}\right]}$$

where $R_0$ is defined as $\rho_0 l/\delta W$, V is total voltage across the element, $l$ is the length of the element, and $\delta$ is the thickness of the element. Since $\Delta\rho/\rho_0$ is small $$I\simeq\frac{V}{R_0}\frac{1}{W}\int_0^W\left\{1-\frac{\Delta\rho}{\rho_0}\left[1-\frac{H_a^2}{(H_k+N_yM_s)^2}\right]\right\}dy$$
$$=\frac{V}{R_0}\left[1-\frac{\Delta\rho}{\rho_0}+\frac{\Delta\rho}{\rho_0}\frac{1}{(H_k+NM_s)^2}\frac{1}{W}\int_0^W Ha^2dy\right] \qquad (5)$$

To linearize this result it is necessary to apply a bias field, $H_b$, in the $y$ direction, so that $$H_a=H_b-H_t\ H_b\gg H_t$$

and $H_t$ is the field due to the tape. Retaining only the linear term in $H_t$ we find for our signal component of voltage, assuming that the device is driven by a current source, $$e_s=2IR_0\frac{\Delta\rho}{\rho_0}\frac{H_b}{(H_k+N_yM_s)^2}\frac{1}{W}\int_0^W H_tdy$$
$$=S\int_0^W\frac{H_tdy}{W} \qquad (6)$$

In terms of the basic resistance versus field curves, Equation 6 may be more succintly written as $$e_s=I\frac{\partial R}{\partial H}\int\frac{Hdy}{W} \qquad (7)$$

Here S has been defined as a sensitivity function characteristic of the device media. S may be conveniently measured by application of a uniform field across the device.

Figure 8:
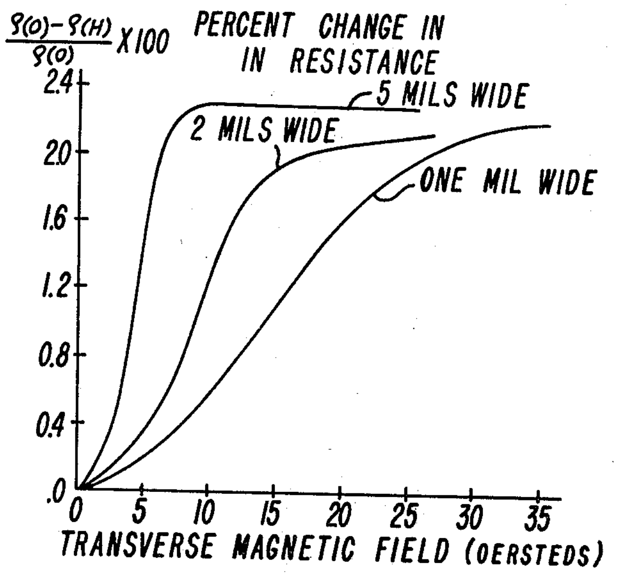
FIGURE 8 is a graph depicting the percentage resistance change in the magnetoresistance of a Permalloy film element of the head versus applied transverse magnetic field, for varying widths W.

FIGURE 8 shows a graph depicting the results of static measurements of the resistance of the Permalloy film element, as a function of the magnitude of a uniform transverse field, wherein values of $[\rho(0)-\rho(H)]/\rho(0)$ are plotted versus the applied field. The curves shown in the figure would be superimposed on one another except for the presence of demagnetizing effects, which are controlled by selection of the film element width-to-thickness ratio. To enhance resolution the thickness and width may be reduced by the same factor, without altering the form of the curves shown. The curve for a 1 mil wide element shows the device will operate linearly for a bias field of about 18–20 oersteds. At nineteen oersteds the slope $\partial R/\partial H$, for the 1 mil element is $\partial R/\partial H=0.014$ $R_0$ ohms/oersted=2.38 ohms/oersted, and thus the sensitivity factor, S is simply $S=I\partial R/\partial H=23.8$ millivolts/oersted, for a drive current of 10 milliamperes. This value is in good agreement with the predictions of Equation 6 supra.

Figure 9:
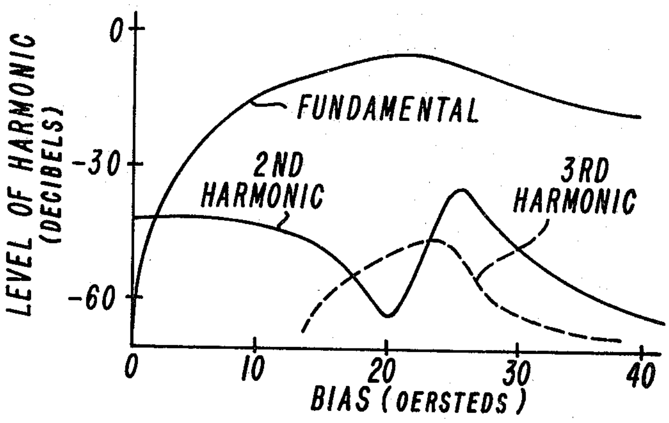
FIGURE 9 is a graph depicting the harmonic distortion of the magnetoresistive head as a function of the applied, uniform transverse bias field.

FIGURE 9 shows a graph comparing the fundamental and the harmonics distortion in decibels as a function of an applied bias field, whereby the optimum bias field may be located. The magnetoresistive head was driven with a one kilocycle, uniform transverse field of one oersted. At a bias field of 19.2 oersteds there is a clear minimum in the 2nd harmonic distortion and this represents the optimum operating point for the magnetoresistive head tested. This value agrees with the predictions obtained from the comparison of resistivity and applied transverse field. For zero bias the fundamental experiences a minimum, i.e., −60 decibels.

Figure 10:
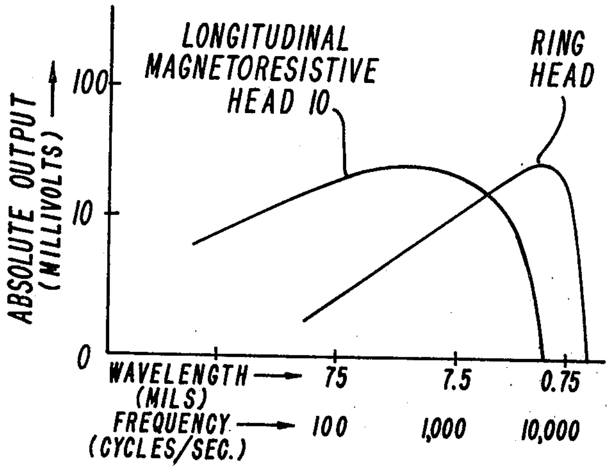
FIGURE 10 is a graph comparing the frequency response of a magnetoresistive head of the invention with that of a conventional ring-type head.

To illustrate the results obtained by a prototype of the invention in accordance with the horizontal embodiment of FIGURE 1, FIGURE 10 compares the frequency response curves therefor with those of a conventional ring-type head. Record level was held at the 1% distortion point and tape speed was 7½ inches per second. Head outputs were measured directly. The test was run with a DC bias field of 19 oersteds. An air jet was used to maintain tape 16 in contact against the film element 12, a technique to keep head wear to a minimum while insuring adequate contact therebteween. It is noted that the magnetoresistive head 10 is approximately 20 db above the ring head in output. As the wave-length approaches 1 mil, the width of the head used herein, the response falls off rapidly; it is apparent that a width W of approximately one-half mil would produce a head of superior qualities to the ring head utilized in the test.

Since in principle the intrinsic frequency response of the magnetoresistive head is limited by dynamic spin considerations, the device should show a constant intrinsic frequency response from direct current to approximately 1 gigacycle. The intrinsic frequency response is defined as the response of the device to a uniform field which is varied to obtain the measurement. Varying the frequency of a coincident drive current line over the range of from 100 cycles per second to 10 megacycles per second produced an intrinsic frequency response curve in the magnetoresistive component of voltage which was perfectly flat out to 10 megacycles. Above 1 mc. an inductive component of voltage became noticeable.

An example of various parameters of the invention are set forth hereinbelow, wherein a theoretical value of S of approximately 18.7 millivolts per oersted compared closely to a test value of S 24 of millivolts per oersted.

| | |
|---|---|
| I | 10 ma. |
| $R_0$ | 1.7k Ω. |
| $\Delta\rho/\rho$ | 0.022. |
| $H_b$ | 20 oe. |
| $H_k+N_yM_s$ | 20 oe. |
| W | 1 mil. |
| $\delta$ | 600 A. |
| $H_k$ | 5 oe. |
| $N_y$ | 0.0015. |
| $M_s$ | 10K gauss. |

Although the present invention has been described with respect to several embodiments, various modifications may be made within the spirit and scope of the invention. For example, various materials other that Permalloy, a nickel-iron magnetic alloy, may be utilized to form the film element of the magnetoresistive head, viz.; Perminvar, a nickel-iron-cobalt magnetic alloy; Supermalloy, a nickel-iron-molybdenum magnetic alloy having a maximum permeability in excess of one million; and ferrite material. In addition, the film element can be formed of various semiconductor materials, such as for example, indium antimonide. Accordingly, the magnetoresistive element of the invention can be formed generally of those materials of the electrically conducting, magnetic material types. Likewise, the glass substrate 14' depicted in FIGURE 2 for supporting the film elements, could be replaced with blocks of magnetic material such as ferrite, bonded in a sandwich configuration to either side of the element, the ferrite material acting to concentrate the tape magnetic field on the magnetoresistive film element of the head. The glass substrate 14 of FIGURE 1 could be replaced by a single block of ferrite with the element 12 secured along the mid-portion thereof. The magnetic material blocks, in turn, are held by a support member such as member 24 of FIGURE 2. Accordingly, it is not intended to limit the scope of the invention except as defined in the following claims.

What is claimed is:

1. A magnetoresistive head assembly for detecting the magnetic fields associated with the magnetization within a magnetic medium comprising;

an element of low anisotropy electrically-conducting magnetic material secured in magnetically bridging relation adjacent the magnetic medium, said element having a selected magnetization state, said state being responsive to the magnetic fields within the magnetic medium which rotate the magnetization in the element and vary accordingly the resistivity thereof;

means adjustably disposed adjacent the element for biasing same with substantially transverse magnetic field; and circuit means connected across the element and responsive to resistivity changes therein in proportion to the degree of rotation of the magnetization within the element and thus the magnetic fields stored in the magnetic medium.

2. The magnetoresistive head of claim 1 wherein the means for biasing generates a substantially uniform transverse magnetic field; and said circuit means includes an electrical driving source connected in electrical series to the element only at either end thereof.

3. The magnetoresistive head assembly of claim 2 wherein the element comprises a film element which is disposed with the applied transverse magnetic field substantially perpendicular to the easy axis of magnetization of the film element.

4. The magnetoresistive head assembly of claim 3 further comprising:

a support means;

said film element being secured to the support means and held thereby in said magnetically bridging relation to the magnetic medium, said film element being coupled to the electrical driving source only at either end thereof;

said means for biasing including a magnet secured to the support means adjacent the element and reciprocally adjustable relative thereto to allow varying the intensity of the biasing transverse magnetic field applied to the element.

5. The magnetoresistive head assembly of claim 4 wherein the support means is formed of glass; and the film element is formed of a magnetic material from the group consisting of Permalloy, a nickel-iron magnetic alloy, Perminvar, a nickel-iron-cobalt magnetic alloy, Supermalloy, a nickel-iron-molybdenum magnetic alloy, and ferrite.

6. The magnetoresistive head assembly of claim 4 wherein the magnet is a permanent magnet for generating a static bias field.

7. The magnetoresistive head assembly of claim 4 wherein the magnet is an electromagnet capable of generating a static and an alternating current bias field.

8. The magnetoresistive head assembly of claim 4 wherein the support means includes an electrically nonconducting base; and said film element defines a generally rectangular flat cross-section with one side thereof secured to said nonconducting base, said support means disposed to support one edge of the film element adjacent the magnetic medium with the plane of the flat film element disposed in substantially perpendicular relation with the plane of the magnetic medium.

9. The magnetoresistive head assembly of claim 8 further comprising:

a plurality of the magnetoresistive film elements disposed end-to-end upon the support means in magnetically shielded relation to define a multiple head assembly;

means disposed adjacent the film elements for biasing each element with a transverse magnetic field; and a plurality of circuit means including an electrical driving source coupled to respective film elements and individually responsive to resistivity changes in their respective film element in proportion to the magnetic fields stored in that portion of the magnetic medium in register therewith.

10. The magnetoresistive head assembly of claim 9 wherein the film elements are deposited substantially inline upon the support means and along an edge thereof, the edges of the plurality of elements confronting the magnetic medium; said means for biasing includes a plurality of magnets adjustably secured to the support means; and said circuit means further includes a plurality of pairs of electrical conducting strips deposited upon the support means in electrical connection to the respective elements, said pairs of conducting strips extending therefrom to connect at their opposite ends to respective electrical driving sources.

11. The magnetoresistive head assembly of claim 4 wherein the support means includes an electrically nonconducting base, and said film element defines a generally rectangular flat cross-section with one side thereof secured to said nonconducting base, said support means disposed to support the opposite side of the film element adjacent the magnetic medium with the plane of the element disposed in substantially parallel relation with the plane of the magnetic medium.

12. The magnetoresistive head assembly of claim 11 further comprising:

a plurality of the magnetoresistive film elements disposed in selected pattern upon the support means in magnetically shielded relation to define a multiple, head assembly;

means disposed adjacent the film elements for biasing each element with a transverse magnetic field; and a plurality of circuit means including an electrical driving source coupled to respective film elements and individually responsive to resistivity changes therein in proportion to the magnetic fields stored in that portion of the magnetic medium in register therewith.

13. The magnetoresistive head assembly of claim 12 wherein the film elements are deposited substantially inline across the support means with the exposed sides thereof confronting the magnetic medium; said means for biasing includes a plurality of magnets adjustably disposed relative to the support means; and said circuit means further includes a plurarity of pairs of electrical conducting strips deposited upon the support means in electrical connection to the respective elements; one strip of each pair extending therefrom to connect to respective electrical driving sources via a common connection and the other strip of each pair extending to complete the circuit to their respective sources.

14. The magnetoresistive head assembly of claim 4 further comprising:

a circular disk rotatably secured to transversely scan across the recording medium and having a plurality of radially extending slots formed at spaced intervals about the periphery thereof;

a plurality of the support means being demountably disposed within the plurality of slots with the respective film elements of each support means disposed to sequentially confront the magnetic medium in magnetic bridging relation upon rotation of the disk;

a plurality of said means for biasing adjustably secured to respective support means within the slots for providing a transverse magnetic field across the respective film elements;

circuit means serially coupled to the plurality of film elements and including an electrical driving source, the circuit means being responsive to resistivity changes in each of the plurality of film elements in proportion to the magnetic field magnetization stored in the magnetic medium.

References Cited

UNITED STATES PATENTS

| | | | |
|---|---|---|---|
| 2,900,451 | 8/1959 | Havstad | 179—100.2 |
| 2,712,601 | 7/1955 | Reinwald | 179—100.2 |

BERNARD KONICK, Primary Examiner

J. R. GOUDEAU, Assistant Examiner

U.S. Cl. X.R.

324—46; 340—174.1